Patented Sept. 6, 1927.

1,641,637

UNITED STATES PATENT OFFICE.

LIONEL CHARLES LUTYENS, OF LONDON, AND REGINALD OSWALD CHILD, OF HARROW, ENGLAND.

COMPOSITION APPLICABLE FOR ROOFING, ROAD SURFACING, AND OTHER PURPOSES.

No Drawing. Application filed April 6, 1925, Serial No. 21,181, and in Great Britain April 11, 1924.

This invention relates to an improved bituminated composition or mixture applicable for various uses, as for instance, roofing, road surfacing, electrical insulation a fire resisting material in the construction of buildings or the like and generally where bituminous compositions can be employed.

If partially coagulated casein be added to bitumen at the temperature at which it enters a fluid condition it is found that the bitumen is given a particular plastic consistency and if then submitted to rolling processes the resulting product is a flexible albeit tough material which can be applied to various purposes for wear, insulation, etc.

The preparation of the improved bituminated composition includes the addition to bitumen, asphalt or other bituminous substance in a melted or fluid condition of a suitable quantity of partially coagulated casein or similar albuminoids, such as egg albumen or blood, starch, alginates, such as Irish moss, which, is added to the bitumen at a temperature at which it will fluidize, such as about 212° Fahr. is found to give the bituminous substance a particular consistency and if it is then submitted to the usual rolling processes the resulting product is a flexible albeit tough material which can be applied to various purposes.

Other ingredients may be added to this composition—such for instance as chemicals adapted to impart fire resisting properties thereto, fillers or fibre or other material for the purpose of reinforcing the same when rolled.

The composition is particularly useful as a substitute for ordinary roofing felt as contrary to the practice usual in manufacture of the latter there is no necessity to employ paper.

In devising the present invention, account has been taken of the known property of casein as a thickening or gelatinizing substance but, contrary to previous proposals in which it is employed in solution, having been dissolved in an alkali, such as sodium carbonate or borax, and then, in some instances mixed with raw or sulphonated oil, the casein is prepared in a partially coagulated form, by dissolving the same in sulphonated oil, raising the temperature slightly such as to 90° Fahr. under constant agitation until coagulation occurs and if necessary aiding the coagulation effect by the addition of some weak acid. This partially coagulated casein is insoluble and is used with the bitumen or bituminous substance and any other desired ingredients in the preparation of compositions suitable for the purposes hereinbefore mentioned.

A composition prepared according to this invention may contain the following ingredients: bitumen, trinidad asphalt, chemicals, such as ammonium sulphates and phosphates (having fire resisting properties) a calcareous or other suitable filling substance, sand or slate flour, asbestos fibre and casein coagulated with sulphonated oil or other media. Heavy mineral oil, such as fluid bitumen, is added to increase the plasticity but this ingredient is used as occasion requires its omission or lessened quantity enabling a satisfactorily plastic composition to be produced.

In preparing the composition or mixture, the bitumen is melted or brought to a fluid condition in a suitable kneading machine. To this fluid bitumen the chemicals—ammonium sulphate and phosphate—are added together with the filler, which may consist of sand or slate flour or a calcareous substance, asbestos fibre, and if desired or necessary a small quantity of heavy mineral oil, such as fluid bitumen. The mixture of heated, melted or fluid bitumen and the several added ingredients or substances is then kneaded into a plastic condition whereupon a suitable quantity of casein which has been partially coagulated by the addition thereto of sulphonated oil, or other media, is added with the effect that the mixture expands or rises and assumes a tough homogeneous and dough-like consistency while being maintained in a heated condition.

The composition or mixture thus obtained may be rendered into sheet form by rolling or other suitable means. It may also be applied by rolling or the like to roofing felt itself or to canvas or any other flexible material as a backing or foundation; or it may be applied to a metal or metallized surface in sheet or other form and adapted for use as, or an applicaton to, a road surface or the like. Or it may be utilized as an insulating medium for electrical purposes such as cables and other conductors or the like.

As yielding good results in practice or experimental use the following proportions have been found suitable in the preparation of the improved composition or mixture but it will be understood that where less plasticity is required the heavy mineral oil is omitted or the quantity lessened:

| | Per cent. |
|---|---|
| Bitumen | 32.43 |
| Trinidad asphalt | 10.81 |
| Ammonium sulphate | 10.81 |
| Ammonium phosphate | 8.11 |
| Heavy mineral oil | 5.40 |
| Calcareous filler | 16.22 |
| Asbestos fibre | 13.52 |
| Casein | 2.70 |

The above is found to result in a substantial fire resisting composition admirably adapted for use as a roofing material owing to its capacity for resisting fire up to a very high degree of temperature. The plasticity may be varied and incidentally the fire resisting capacity increased by either omitting the heavy mineral oil or modifying the quantity used. A reinforcing substance in the form of vegetable fiber, mineral filings or the like may be added to the mixture prior to the introduction of the casein.

The proportions of the ingredients given above are exemplary but it will be understood that, in the preparation of the composition or mixture, variations may be made therein to suit varying conditions or uses.

For instance, in applying the composition to road surfacing the fire resisting chemicals, ammonium sulphates and phosphates—may be dispensed with and the amount of bitumen and filler ingredients increased, or the filler may be omitted, and an increased quantity of bitumen included. Also where less plasticity is required the heavy mineral oil, as previously stated, may be varied or lessened in quantity or entirely dispensed with.

Although in the above description casein is referred to as having the propery of causing the bitumen to assume a particular dough-like consistency and as such is suitable to the purpose of the invention, certain albuminoids, starches and alginates or other substances of a like kind are capable of similar action in relation to the bitumen and serve as carriers or stabilizers thereof and they may be used instead of the casein. It will be understood that the action of such carrier or stabilizer is colloidal and that the added colloid by acting dispersively prolongs in increased degree the colloidal suspension of the hydrocarbon contents of the composition with the effect that light influence in bringing about decolloidation or coagulation is retarded and increased stability obtained. The bitumen is thus enabled to combine with the water,—this latter is naturally part of the casein and represents 2.16% in the value of the casein—or in other words to assist in blending the said water with the bitumen without affecting its waterproof qualities or colloidal values while not affecting the molecule of the hydrocarbon substance or content.

We claim:—

1. The method of making a water-proof bituminous composition for roofing, road surfaces, and other purposes, which consists of introducing casein in a partially coagulated and highly viscous state into a homogeneous plastic bituminous mixture and permitting the combined mixture to expand and rise to a tough dough-like consistency.

2. The method of making a water-proof bituminous composition for roofing, road surfaces, and other purposes, which consists in heating and in kneading a bituminous mixture to render the same homogenous and plastic, adding thereto a quantity of casein in a partially coagulated and highly viscous state and maintaining the heated and plastic condition of the combined mixture while allowing the same to expand and rise to assume a tough dough-like consistency.

3. The method of making a water-proof bituminous composition for roofing, road surfaces, and other purposes, which consists in heating and kneading a bituminous mixture to render the same homogenous and plastic, treating casein at a low temperature with a sulphonated oil to partially coagulate the same and render it highly viscous, adding the casein thus prepared to the prepared bituminous mixture while maintaining the heated and plastic condition thereof, and permitting the combined mixture to expand and rise to assume a tough dough-like consistency.

In testimony whereof we have hereunto subscribed our signatures at London, England March 1925.

LIONEL CHARLES LUTYENS.
REGINALD OSWALD CHILD.